United States Patent [19]

Pepperhoff et al.

[11] 4,028,098
[45] June 7, 1977

[54] CRYOGENIC STEEL

[75] Inventors: Werner Pepperhoff, Duisburg-Huckingen; Friedhelm Richter, Mulheim (Ruhr), both of Germany

[73] Assignee: Mannesmann Aktiengesellschaft, Dusseldorf, Germany

[22] Filed: June 30, 1975

[21] Appl. No.: 591,594

Related U.S. Application Data

[63] Continuation of Ser. No. 447,866, March 4, 1974, abandoned.

[30] Foreign Application Priority Data

Mar. 6, 1973 Germany .......................... 2311739

[52] U.S. Cl. .................................. 75/126 B; 62/55; 75/126 E
[51] Int. Cl.² .................. C22C 38/24; C22C 38/38
[58] Field of Search ......... 75/126 B, 126 E, 126 D, 75/126 F, 122, 134 N; 138/178; 62/45, 55, 114

[56] References Cited

UNITED STATES PATENTS

| | | | |
|---|---|---|---|
| 2,546,525 | 1/1950 | Sheridan | 75/126 B |
| 2,814,563 | 11/1957 | Dyrkacz | 75/126 B |
| 2,949,355 | 8/1960 | Dyrkacz | 75/126 B |
| 3,065,069 | 11/1962 | Manganello | 75/126 F |
| 3,112,195 | 11/1963 | Souresny | 75/126 B |
| 3,820,980 | 6/1974 | Hartline | 75/126 B |

FOREIGN PATENTS OR APPLICATIONS

| | | | |
|---|---|---|---|
| 778,597 | 7/1957 | United Kingdom | 75/126 R |

*Primary Examiner*—Arthur J. Steiner
*Attorney, Agent, or Firm*—Ralf H. Siegemund

[57] ABSTRACT

A manganese chromium steel with 20 to 30% Mn, 5 to 12% Cr; up to 0.5% C and additives such as 1.5% Si, 0.5% V and possibly others. The steel is preferably used for pipes transporting liquified gas. The steel has relatively low thermal expansion.

1 Claim, 1 Drawing Figure

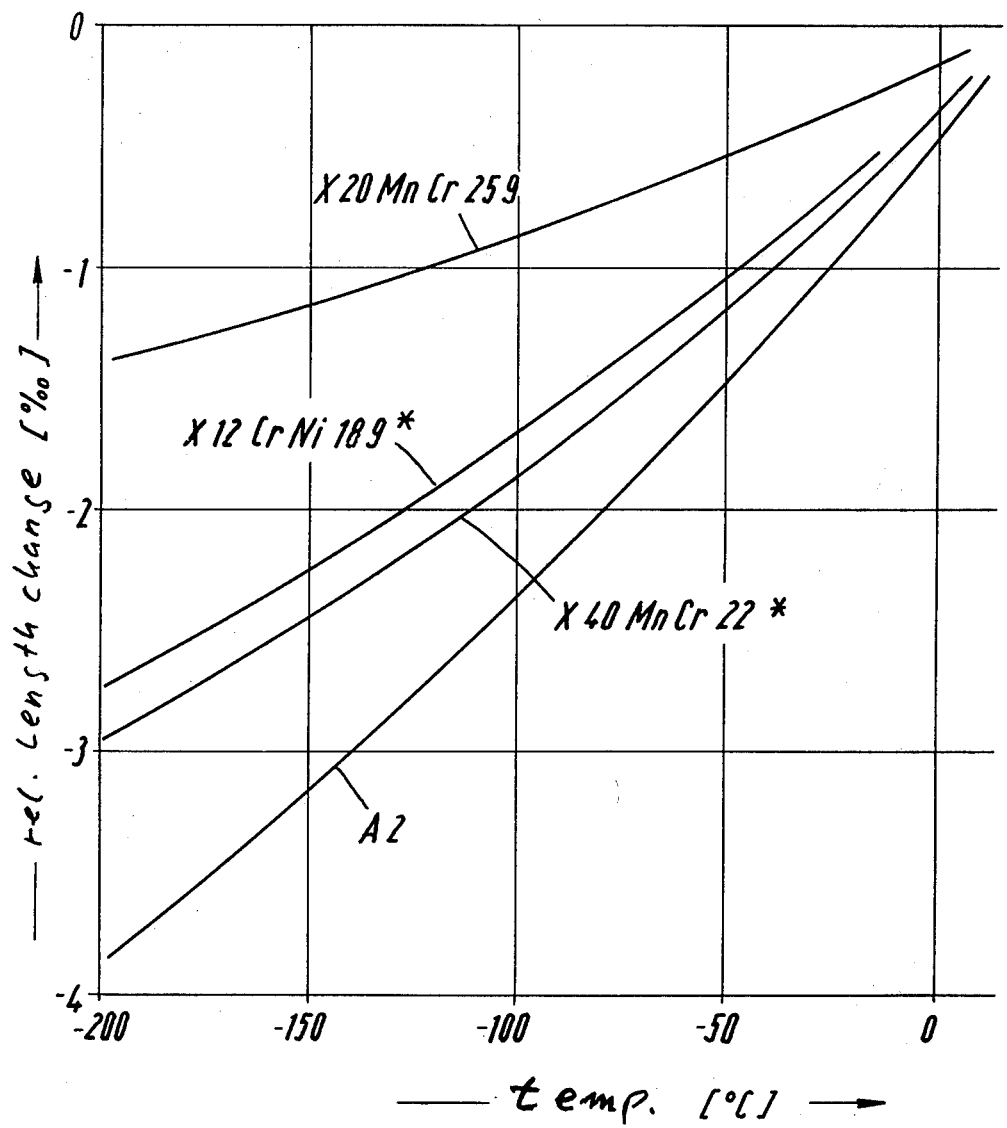

CRYOGENIC STEEL

This is a continuation of application Ser. No. 447,866, filed Mar. 4, 1974, now abandoned.

BACKGROUND OF THE INVENTION

The present invention relates to a manganese-chromium steel to be used for construction parts, preferably tubes or pipes, which will be operated at very low temperature (cryogenics).

Ferritic nickel steels, having up to 9% nickel are used at low temperatures, but only above −190° C. Austenitic chromium nickel steel of the type X 12 CrNi 18 9 is used at lower temperatures. Also, aluminum or austenitic manganese steel of the type X40 MnCr with 4% chromium added can be used at lowest temperature.

Particularly the material known under the designation X40MnCr 22 has still adequate and desirable ductility at low temperatures. However, all these known materials have a relatively large coefficient of thermal expansion. Thus, as parts made of any such material are cooled down to operating temperature, their dimensions change significantly. Considering for example pipe lines, they incur considerable changes in length dimensions and extensive and expensive steps must be taken e.g. for length compensation at interconnections only short distances apart. Moreover, steel with a high nickel content is quite expensive.

SUMMARY OF THE INVENTION

It is an object of the present invention to provide for a steel alloy with small coefficient of thermal expansion and for use in cryogenics.

The invention is the result of extensive investigations according to which manganese steel parts change their length dimensions to a particular degree due to the austenitic texture. Even if small quantities of chromium are added, these length changes are in the same order as one can expect for austenitic chromium nickel steel. However upon increasing the chromium content in the manganese steel above 4%, the relative length change drops drastically and is only about half the usual value at a chromium content of about 10%. On the other hand, low temperature ductility of the steel is hardly changed even if such a high chromium content is used.

In accordance with the present invention, it is suggested to provide a manganese chromium steel wherein iron is alloyed with 20 to 30% Mn, 50 to 12% Cr, and up to about 0.5% C for stabilizing the austenit (all percentages by weight). One can add up to 1.5% Si and up to 0.5% V for enhancing strength.

Other additives as they are conventionally added to austenitic steel for determining strength do not change the stated properties of the steel as far as low thermal expansion and low temperature ductility is concerned.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The Figure is a diagram in which relative length changes e.g. of a tube made in accordance with the invention is plotted against temperature, with additional curves showing the behaviour of some known materials.

The abscissa of the Figure ranges from about room temperature (somewhat about 0° C) to about −200° C (−328° F). Curves 1, 2 and 3 show respectively the relative length change over that range for aluminum; x12 CrNi 18 9; and X40Mn Cr 22; the latter having a low chromium content. Curve 4, plotted under the designation X20 Mn Cr 259 represents an austenitic manganese chromium steel with components as per the present invention. Curves 2 and 3 have been calculated on the basis of information contained in "Stahl-Eisen-Werkstoff Blatt (steel-iron material information sheet 680–60".

As can be seen from the drawing, the relative length change of the novel material is only 1.4% for a temperature drop from room temperature to −200° C (−328° F). The known steels change their length by twice that value or more, aluminum even almost by three times that value.

It can readily be seen, that the steel having composition in accordance with the invention has significant utility for pipe lines used for transporting liquified gas, because length compensation is not as difficult and construction is simplified accordingly. Actually, long sections of a pipe line can be constructed from welded pipes without incurring undue stress. On the other hand, the cost for such steel is below the nickel steels used previously for that purpose.

The invention is not limited to the embodiments described above but all changes and modifications thereof not constituting departures from the spirit and scope of the invention are intended to be included.

We claim:

1. In a method comprising conducting cryogenic liquids through pipes or tubes, the improvement comprising said pipes or tubes being fabricated from a steel consisting of 20% to 30% Mn, 5% to 12% Cr and non-zero quantities of up to about 0.5%C, up to 1.5% Si and up to 0.5%V.

* * * * *